United States Patent [19]
Halverson

[11] 3,908,600
[45] Sept. 30, 1975

[54] METHOD FOR MAINTAINING HEALTH OF CONFINED MINK

[76] Inventor: Doel Halverson, Rt. 1, P.O. Box 64, Dodgeville, Wis. 53533

[22] Filed: May 3, 1974

[21] Appl. No.: 466,900

[52] U.S. Cl. .............................. 119/51 R; 119/72
[51] Int. Cl.² ........................................ A01K 7/00
[58] Field of Search ................ 119/51 R, 51.5, 72; 241/185 R

[56] References Cited
UNITED STATES PATENTS
2,904,268 9/1959 Chappell et al. ............ 241/185 R X
3,577,957 5/1971 Sandig ............................ 119/51.5

Primary Examiner—Hugh R. Chamblee
Attorney, Agent, or Firm—Wenderoth, Lind & Ponack

[57] ABSTRACT

Ice cakes are fed to the hopper and are chipped by the chipper elements to a mixture containing 80% ice particles with no dimension exceeding one-fourth inch and 20% fines. Such mixture satisfies hydration needs of confined mink for periods of a week or more when placed in their feeders. The machine efficiently produces such a mixture.

2 Claims, 4 Drawing Figures

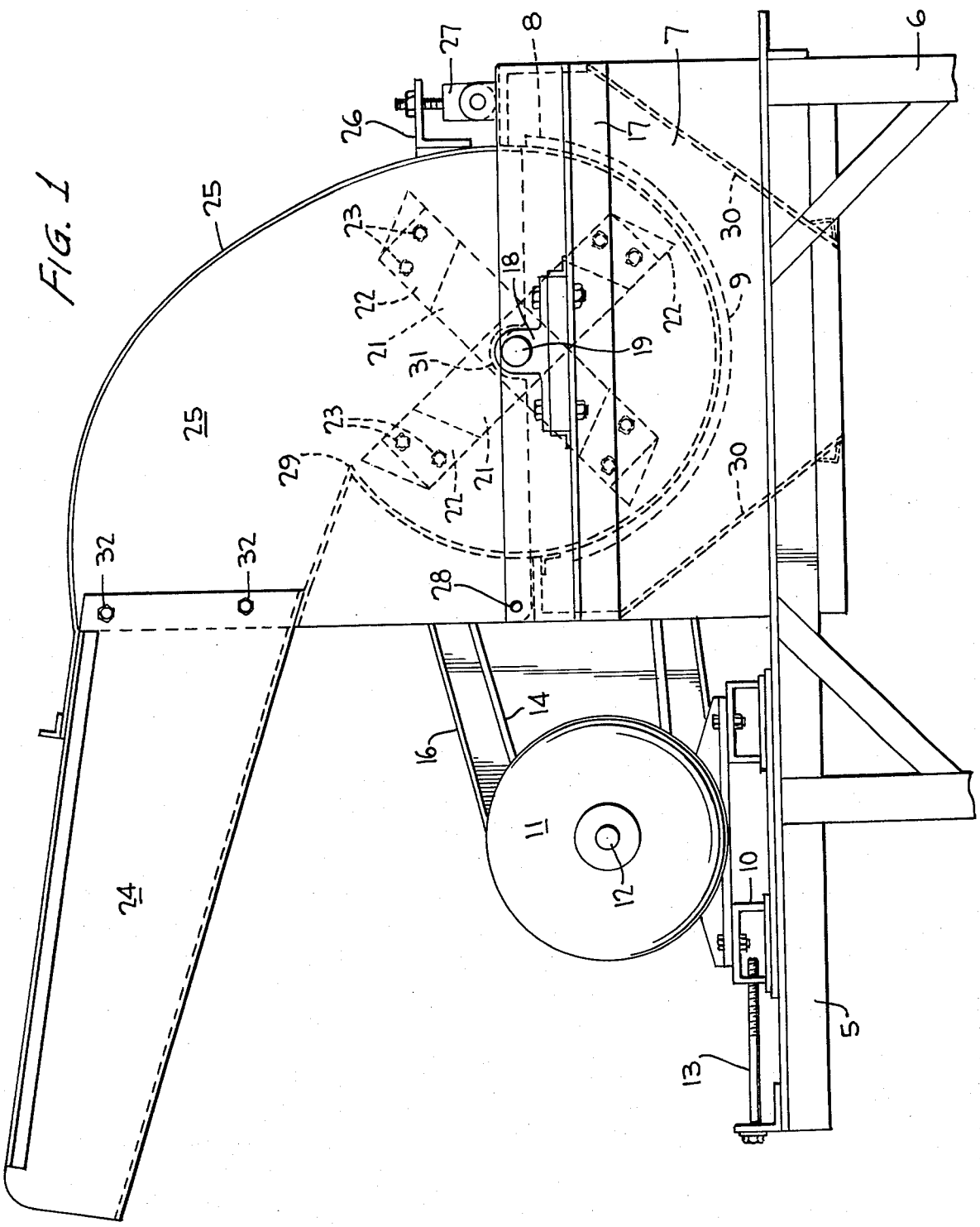

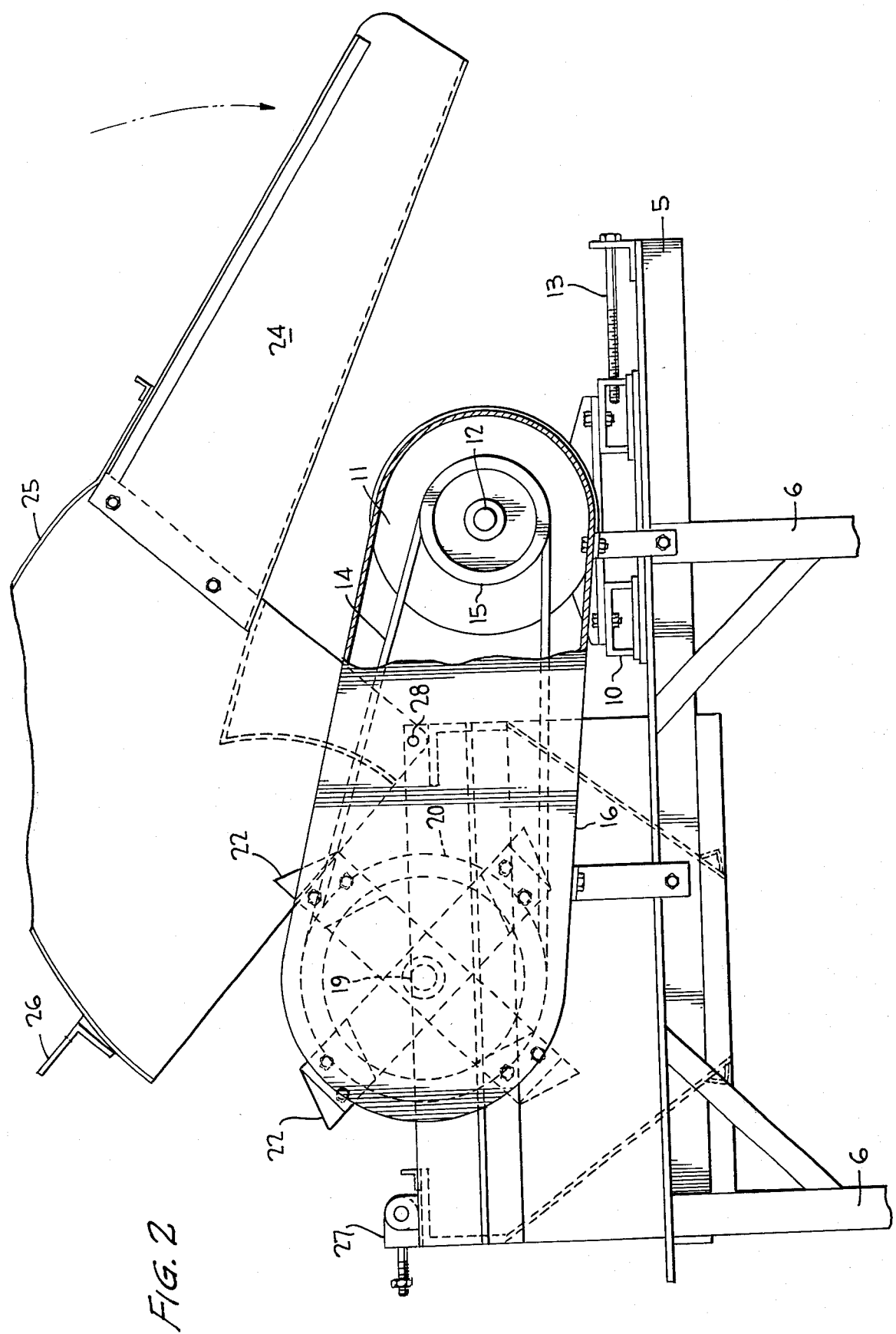

METHOD FOR MAINTAINING HEALTH OF CONFINED MINK

This invention relates to a means and process for keeping confined mink in the best of health particularly in temperatures below 32°F., which prevails for the greater part of the year in the territory where mink ranches are generally located.

An object of the invention is to maintain the hydration level of the confined mink substantially normal during subfreezing temperatures thereby improving the health and fur of the mink.

A further object is to substantially reduce the time of labor required in taking care of the mink.

A still further object is to reduce the losses generally incurred during subfreezing temperatures.

A further object is to produce and provide for the confined mink water in the form of ice granules or particles and ice fine or dust of the size and configuration capable of being handled by the mink.

A further object is to produce much better breeders among confined mink.

A further object is to produce a specific type of ice chipper capable of producing the desired mix of 80% granules and 20% fines in one operation.

With the above and other objects and advantages in view which will appear from the following detailed description of the method and the means for securing the essential desired mix of granules of the proper size and fines in the proper proportions, reference is made to the drawings forming a part hereof in which:

FIG. 1 is a side view of the ice chipper with parts broken away.

FIG. 2 is a side view of the stand and pulleys with parts broken away.

Figure 4:
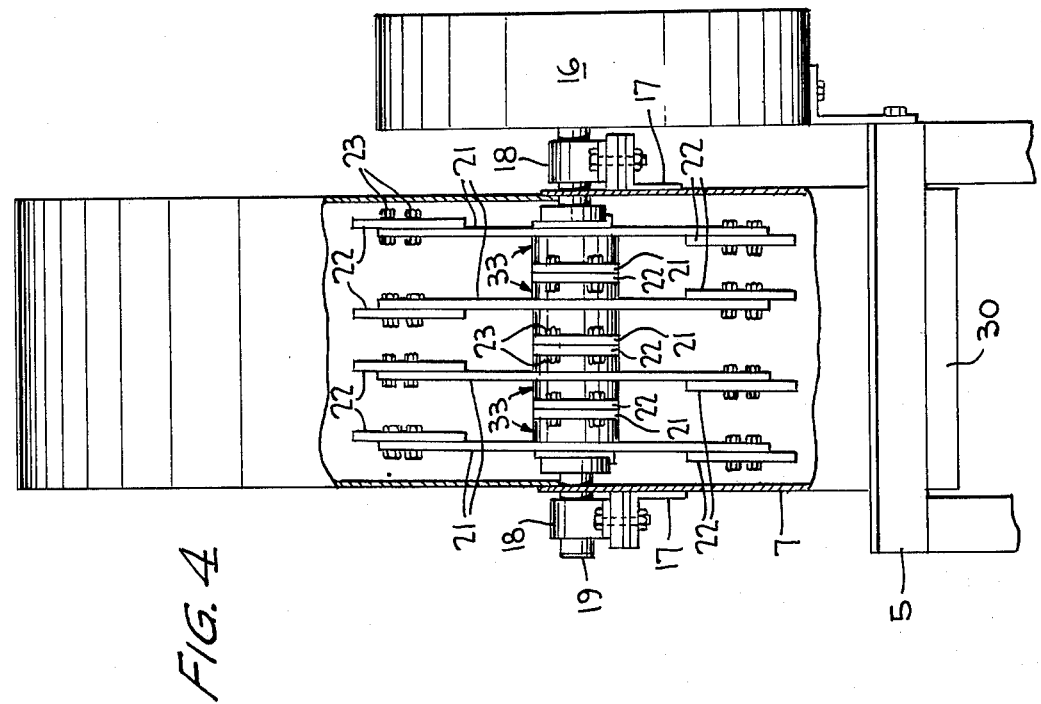
FIG. 4 is a rear view with parts omitted.
Figure 3:
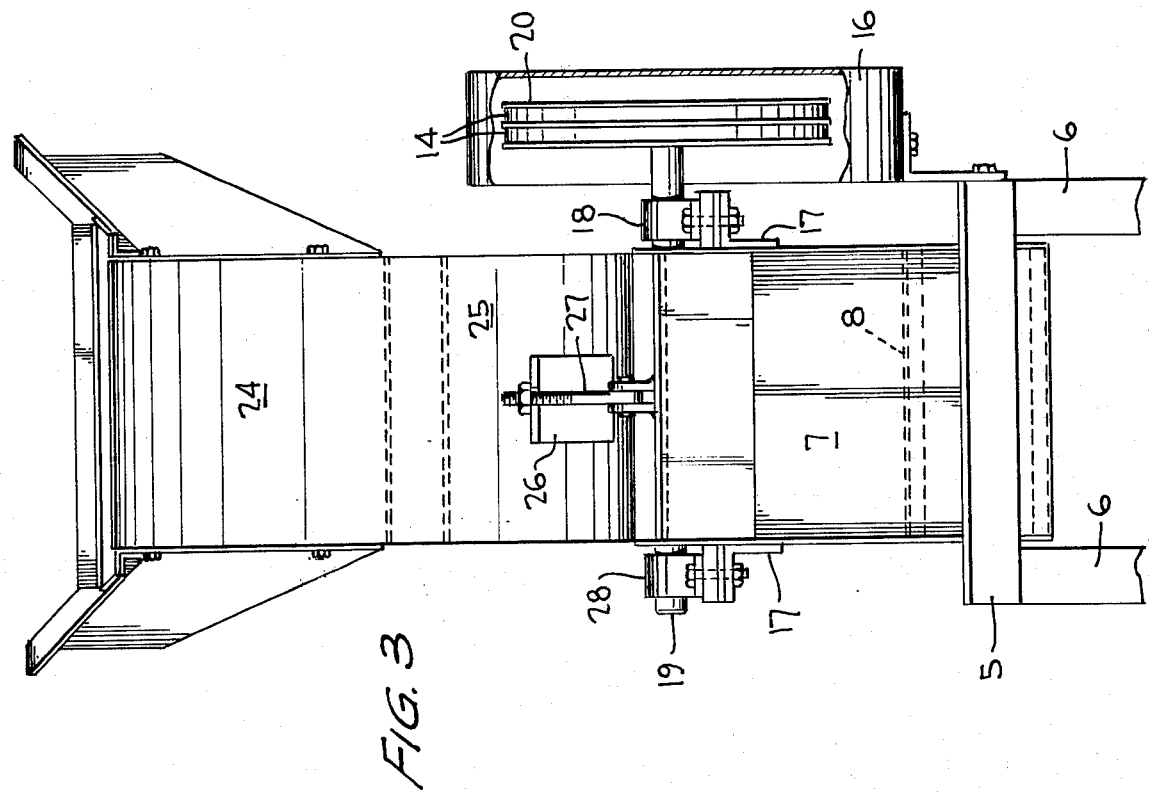
FIG. 3 is a back view of the chipper.

In order to replace the tedious job of watering mink about 6 hours every day after many experiments and tests the machine shown in the drawings was developed to produce the ice granule that was absolutely essential and the mix with fines to secure normal hydration of confined mink during sub-freezing temperatures. Such a granule should have no dimension exceeding one-fourth inch. If the granule was too coarse with dimensions above one-fourth inch the mink would take it into a corner of their nest or drop it through the wire of the pen, dropping it to the floor and therefore lost.

The ratio of granules to fines should be approximately 80% to 20%. If the fines are greater in the ratio then the fines freeze in a chunk in the feeder and the mink can not use it.

As indicated above, about 6 hours of labor every day is required on an average ranch for watering the mink and on exceptionally cold days this does not prevent dehydration with consequent loss to the rancher and inferior fur. However, when using the ice granules and fines of this invention the feeders are only filled four times a month which takes about six hours each time the feeders are filled. As above pointed out, with the old method of carrying water it takes about six hours every day of the month. There is therefore a tremendous saving of labor for the mink rancher and a saving of the expense for labor.

Furthermore, a healthier mink is produced.

Referring to FIG. 1 a stand 5 is provided with four legs 6. Mounted on the stand 5 is the main housing 7 having an inlet and outlet and mounted at the top of the housing is a semicircular screw 8 extending downwardly towards the outlet with ¾ inch holes 9.

Bolted to the stand 5 at one end are the motor mounts 10 for the electric motor 11 having a shaft 12. A belt tightener assembly 13 cooperates with the motor mounts 10 for tightening a belt 14 extending over a V pulley 15 mounted on shaft 12 of motor 11. A belt guard 16 covers the belt 14 and the pulley 15.

Located on two sides of the housing 7 at the inlet and bolted thereto are angle bars 17. The bars 17 serve as supports for the bearings 18 which are bolted thereto. A shaft 19 is mounted approximately midway of the inlet in bearings 18 and has mounted thereon outside of the housing 7 a pulley 20 which is driven by belt 14 which is driven in turn by the pulley 15 on motor shaft 12. The pulley 20 is also covered by the guard 16.

The shaft 19 has mounted thereon the cutter bars 21, preferably seven in number, and bolted to each cutter bar 21 at the ends thereof by the bolts 23 are the ice chippers 22. The outer ends of the chippers rotate about one-fourth inch from the screen 8. The ice chippers on each bar are located on opposite sides.

The ice hopper 24 and the hood 25 form a unitary assembly which is pivoted at 28 to the top of the housing 7 at both sides thereof. At the free end of the hood 25 is an angle plate 26 which cooperates with the latch assembly 27 fixed to the top of housing 7.

The slides 30 below the screen 8 guide the granules and fines to a tray. At the point 29 where the chunks of ice encounter the rotating chippers 22 almost 80% of the work is done since it is a chipping action mostly. The chippers rotate at approximately 1100 RPM. Also ice may be processed through the machine at 200 pounds per minute.

The hood 25 has at its bottom edge on both sides a slot 31 which encircles the shaft 19 when the hood 25 is in closed position and is latched to the housing 7 by latch 27. The hopper 24 and the hood 25 are bolted together by the bolts 32 and will pivot together about 28 so that when the hood is open ice cannot flow toward the chippers because the hopper is directed downwardly away from the chippers. Therefore in order to secure proper operation hood 25 must be closed and latched.

Each chipper 22 is three eighths inch wide and they are spread apart a little over one-fourth inch. The chamber 7 for 14 chippers is 10 inches wide. The bars 21 maintain the proper spacing on shaft 19 by the means 33. The chippers run very close to the screen 8 — about one-fourth inch.

The operation is as follows:

As the ice chunks comes down the hopper, it makes contact with the ice cutters or chippers 22. About 80% of the work is done at this point. This is what gives the big capacity needed and by the special designed cutters or chippers there is not nearly as much fine powdered ice. The machine gives about 20% fine; the rest is chips of carcked granules. This comes out all mixed together; about 80% granules up to one-fourth inch in diameter, and mixed with only 20% fines. This right proportion of fine mixed ice with the up to one-fourth inch size keeps it from freezing together and the mink pick it up and eat it readily. Anything larger in size of ice pieces is not suitable.

The screen 8 in the bottom of the machine has three fourth inch holes. This catches any larger chunks of ice that come off in the cutting operation and the cutters process this into the desirable size before it leaves the machine. All ice fed into the machine results in being usable for the mink.

The machine was tested and it produces 200 pounds of ready to feed granules per minute.

To acquire an ice mixture of 20% fine and 80% up to one-fourth inch required much experimenting and testing.

The machine will not do anything but produce this one type of granule mix, and will process only ice.

As far as is known this is the first time such a mix of ice has been used for watering confined mink.

In the claims below the term "subfreezing temperatures" means temperatures below 0°C or 32°F.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I Claim:

1. A process for maintaining a normal hydration level in confined mink during subfreezing temperatures comprising preparing an ice mix having approximately 80% ice granules with no dimension exceeding one-fourth inch and 20% fines and placing said mix in the mink feeders whereby no further watering is required for approximately one week thereby saving considerable labor.

2. A process as set forth in claim 1 wherein said mix is prepared in the same unitary operation.

* * * * *